R. E. HELLMUND.
SYSTEM OF CONTROL.
APPLICATION FILED MAY 26, 1917.

1,328,514.

Patented Jan. 20, 1920.
2 SHEETS—SHEET 2.

WITNESSES:
William Siler.
W. R. Coley

INVENTOR
Rudolf E. Hellmund.
BY
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,328,514.  Specification of Letters Patent.  Patented Jan. 20, 1920.

Application filed May 26, 1917. Serial No. 171,166.

*To all whom it may concern:*

Be it known that I, RUDOLF E. HELLMUND, a citizen of the United States, and a resident of Swissvale, in the county of Allegheny and State of Pennsylvania, have invented a new and useful Improvement in Systems of Control, of which the following is a specification.

My invention relates to systems of control and especially to the automatic control of electric railway motors and the like.

The object of my invention is to provide a system of the above-indicated character which shall embody means for effecting automatic speed control during both acceleration and regeneration, with manual adjustment of the desired mean rate of speed, in combination with other automatic means, in the form of relay devices, for example, for preventing certain abnormal machine conditions, such as excess current or an unduly high ratio of armature ampere-turns to field-winding ampere-turns.

My invention may best be understood by reference to the accompanying drawings, wherein.

Figure 1:
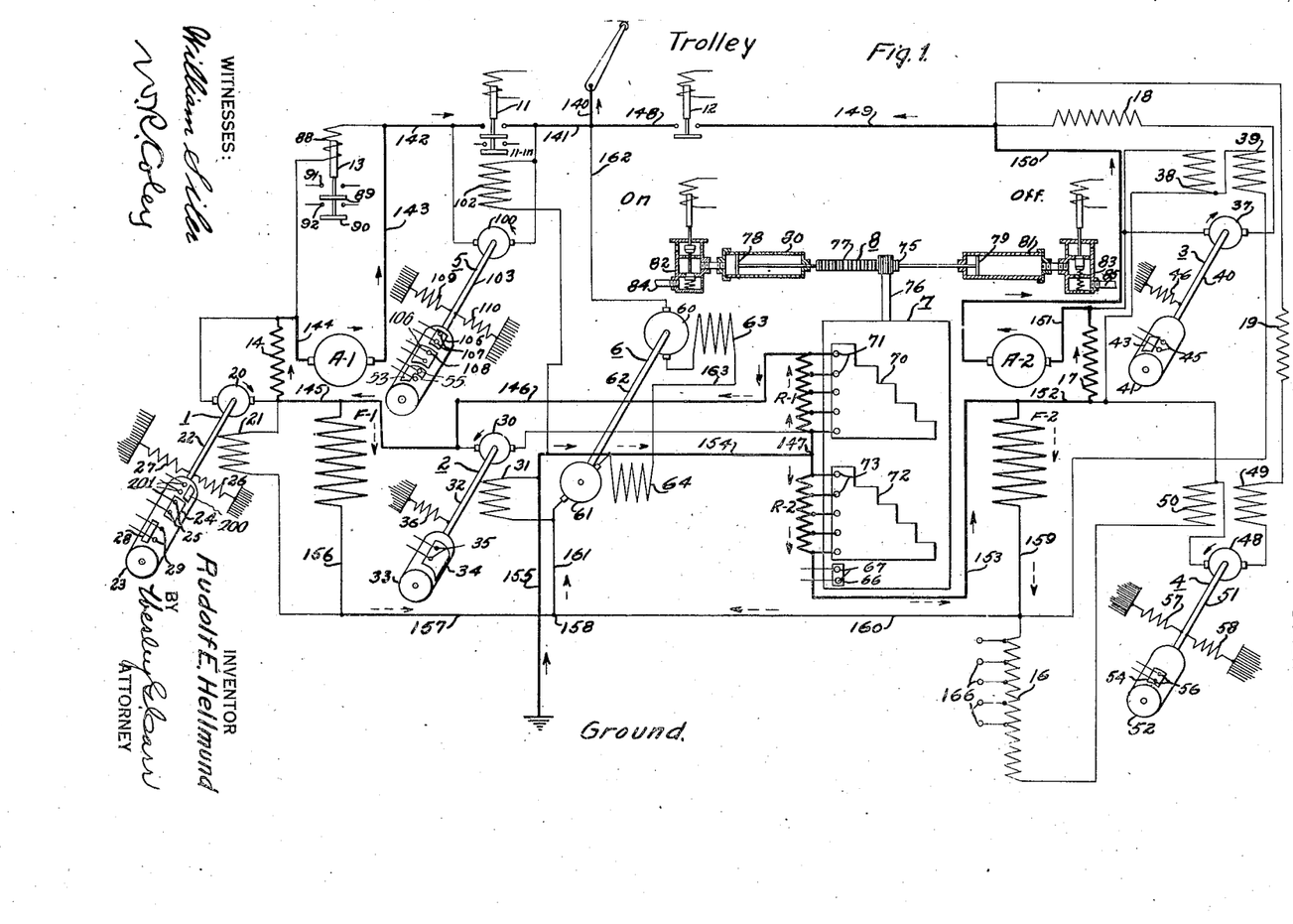
Figure 1 is a diagrammatic view of the main circuits of a system of control embodying my present invention, together with the primary circuits of a plurality of relay devices for effecting certain functions to be set forth.

Referring to Fig. 1 of the drawings, the system shown comprises suitable supply-circuit conductors "Trolley" and "Ground"; a plurality of main dynamo-electric machines respectively having armatures A1 and A2 and field windings F1 and F2 of the series type; a plurality of torque-relay devices 1 to 5, inclusive, that have their component elements respectively connected to various machine circuits to govern the main-machine speed and other electrical conditions of the main circuits, as hereinafter more fully described; a motor-generator set 6 that is driven from the supply circuit and is connected to energize the main field windings F1 and F2; a plurality of resistors R1 and R2 that are associated with the respective main machines in a manner to be set forth; a controller 7 having an operating mechanism 8 for varying the active circuit values of the resistors R1 and R2; a plurality of main-circuit switches 11 and 12; an over-voltage relay 13; and a plurality of main- and auxiliary-circuit resistors 14, and 16 to 19, inclusive, that are employed for purposes to be explained.

The relay device 1 is adapted to automatically prevent an excessive main-machine torque and is shown as comprising a commutator-type armature 20 that is connected across the main-circuit resistor 14; and a field winding 21 which is connected across the main field winding F1. The shaft 22 of the armature 20 carries a small drum or cylinder 23, upon which is mounted a relatively wide contact segment 24 that bridges a pair of stationary contact members 25 in the illustrated intermediate or normal position of the torque relay. A second contact segment 28 bridges stationary contact members 29 in another position of the relay. A plurality of opposing similar springs 26 and 27 are suitably secured to the shaft 22, whereby the relay device is maintained, under normal operating conditions, in the intermediate position shown.

The torque relay device 2 is adapted to prevent the main-field-winding ampere-turns from exceeding the main-armature ampere-turns more than a predetermined amount during the accelerating period, to prevent "flash-over" difficulties, and comprises a commutator-type armature 30 that is connected across the main-circuit or stabilizing resistor R1 and a field winding 31 that is energized from the generating element of the motor-generator set 6. However, any other uni-directional voltage may be employed to excite the field winding 31. The relay shaft 32 carries a small drum 33, upon which is mounted a contact segment 34 which bridges a pair of stationary contact members 35 in both the illustrated intermediate position and in an adjacent position, a spring 36 being secured to the shaft 32 for opposing the torque of the armature 30.

The torque-relay device 3 is arranged to limit the maximum ratio of main-armature ampere-turns to main-field-winding ampere-turns during the regenerative period, whereby the danger of "flash-over" conditions in the main machines is precluded. The device comprises a commutator-type armature 11a 37 which is connected through the resistor 18 across the main armature A2; a field winding 38 that is connected to the terminals of the main-circuit resistor 17 and a field winding 39 that is connected across the main field winding F2 to act differentially with respect to the field winding 38. The relay shaft 40 has mounted upon it a small cylinder 41 which carries a contact segment 43 that is adapted to bridge a pair of stationary contact members 45 in one position of the relay device, as determined by the torque of the armature 37 and the opposing action of a suitable spring 46 that is secured to the shaft 40.

The relay device 4 is adapted to automatically control the vehicle speed by strengthening or weakening the main field windings, as hereinafter described in detail, and comprises a commutator-type armature 48 that is connected through one field winding 49 and the resistors 19 and R2 across the supply circuit and a second field winding 50 that is connected through a variable resistor 16 across the main-field-winding F2. The field windings 49 and 50 are differentially related to each other. The relay shaft 51 carries a small drum 52, upon which is mounted a contact segment 54 that is adapted to bridge a pair of stationary contact members 56 in certain positions of the relay device, for purposes to be pointed out. A plurality of centering springs 57 and 58 are suitably secured to the relay shaft 51 to normally maintain the relay device in the illustrated intermediate position.

The torque-relay device 5 is adapted to adjust or balance circuit conditions during the coasting period before the closure of the main switches to produce a voltage in the main armatures that bears any predetermined ratio to the supply-circuit voltage, thus permitting the completion of the main circuits to effect regenerative or other operation. The relay device, in its preferred form, comprises a commutator-type armature 100 which is connected across the main-circuit switch 11 and a field winding 102 that is connected across the supply circuit. The relay device shaft 103 has mounted upon it a small cylinder 104 carrying a plurality of contact segments 53, 105 and 106 that are adapted to bridge pairs of stationary contact members 55, 107 and 108 in certain positions of the relay device, as subsequently set forth in detail. A plurality of centering springs 109 and 110 are provided to normally maintain the device in the illustrated intermediate position.

The motor-generator set 6 embodies a driving armature 60, a generating or exciting armature 61 which is mechanically attached thereto in any suitable manner, as by a shaft 62, and field windings 63 and 64 for the driving armature 60 and the exciting armature 61, respectively, that are energized in accordance with the load current of the motor-generator set, as hereinafter traced in detail.

The controller 7 comprises a contact segment 70 of suitable configuration for successively disengaging a plurality of control fingers 71 as the controller is moved forwardly through its successive positions, whereby the resistor R1 is gradually introduced into circuit to weaken the main-field-winding excitation. A contact segment 72 and a plurality of control fingers 73 serve a similar purpose with respect to the main-circuit resistor R2. An auxiliary contact segment 66 is bridged by a pair of stationary contact members 67 in the initial controller position, for a purpose to be set forth.

The operating mechanism 8 is of a familiar electrically-controlled, fluid-pressure-operated type and comprises a pinion 75 which is rigidly secured to the shaft 76 of the control drum 7 and is adapted to mesh with a horizontally movable rack member 77, the opposite ends of which constitute pistons 78 and 79 that are adapted to travel within suitable operating cylinders 80 and 81, respectively. A normally closed valve, having an operating coil marked "On," is associated with the outer end of the cylinder 80 to admit fluid pressure thereto when the coil is energized, while a normally open valve 83 communicates with the outer end of the other cylinder 81 and is provided with an actuating coil marked "Off" which, when energized, closes the valve. Fluid pressure is conveyed from any suitable source (not shown) through pipes or passages 84 and 85 to the valves 82 and 83, respectively.

The mechanical operation of the apparatus just described, without regard to the electrical connections effected thereby, may be set forth as follows: The normal admission of fluid pressure to the cylinder 81 biases the mechanism and the control drum 7 to the "off" position shown. Upon concurrent energization of the coils "On" and "Off," the initial unbalanced fluid-pressure conditions are reversed, that is, fluid pressure is admitted to the cylinder 80, through the valve 82 and is exhausted from the cylinder 81, through the valve 83, whereby the control drum 7 is forwardly actuated through its successive operative positions.

To arrest such movement at any time, it is merely necessary to deënergize the "off" coil, whereupon balanced fluid-pressure conditions immediately obtain in the two operating cylinders and a positive and reliable stoppage of the actuating mechanism obtains. To effect a return movement of the apparatus, both actuating coils are concurrently deënergized to thereby effect a reversion of fluid-pressure conditions to the original unbalanced state and thus cause the desired backward movement of the controller.

Figure 2:
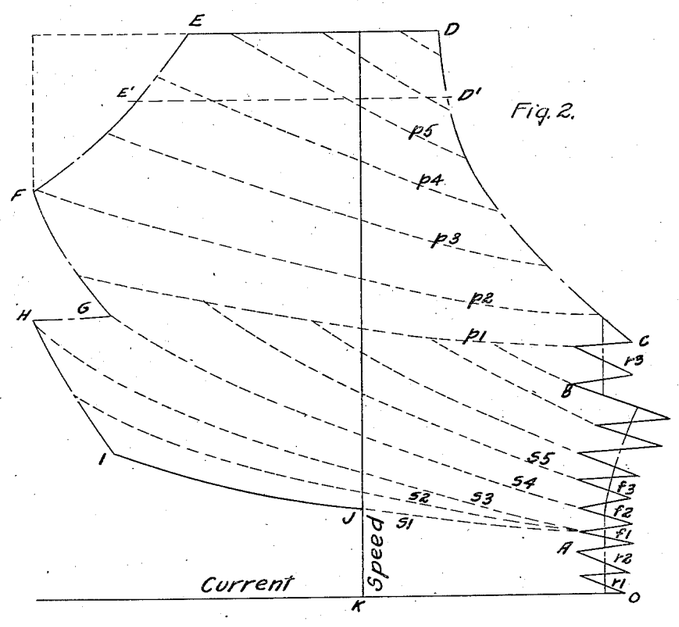
Fig. 2 is a curve chart representing the complete cycle of accelerating, coasting and retarding machine operation.

Reference may now be had to the chart of Fig. 2, wherein the area OABCDEFGHIJK represents a complete cycle of operation of a dynamo-electric machine, starting from rest, through series-parallel acceleration in conjunction with rheostatic and field-strength control, coasting, and parallel-series regenerative control, in conjunction with field-winding-current regulation.

The solid and dot-and-dash outlines of the chart indicate the limits of satisfactory operation, as determined by various motor characteristics and maximum permissible tractive efforts. The dotted curves $s1$, $s2$, etc., represent the familiar speed-current curves under various given conditions during series connection of a pair of motors of the type shown in Fig. 1 and the dotted curves $p1$, $p2$, etc., correspond to the parallel connection of such motors. The saw-tooth curves $r1$, $r2$, etc., denote the motor operation in connection with the usual step-by-step resistance control, while the saw-tooth curves $f1$, $f2$, etc., represent control of the main machine by variation of field strength only.

The intermediate dot-and-dash line that threads the curves $r1$, $r2$, etc., corresponds to the similar outlines of the remainder of the chart, such dot-and-dash lines being taken, in the interests of simplicity, in lieu of the saw-tooth curves that more closely depict the actual machine operation.

In accelerating the motor along the broken line OA, corresponding to series-resistance control, the only limitation is the maximum permissible accelerating torque with respect to the capacity of the motors, for example, and a similar single limitation holds when accelerating the machines through the remainder of series control (broken line AB) and parallel resistance control to the point C, where parallel free-running conditions (field-strength control) begins. Under such conditions, it is dangerous to permit the armature ampere-turns to exceed a predetermined relation to the corresponding field-winding ampere-turns, dependent upon the design of the machines, inasmuch as such an excess may cause an undue distortion of the field-winding flux, accompanied by relatively high voltage between commutator segments and the resultant liability to "flash over" difficulties.

The solid horizontal line DE represents the maximum safe speed, which is the determining factor during the corresponding portion of the machine cycle.

During the initial or high-speed decelerating period, the machine operation may again be limited by the liability to "flash-over" troubles, and the curve section EF, consequently, represents the maximum permissible operation during this period. Subsequently, as the main field-winding current increases, such liability disappears, and the only limitations imposed are the maximum permissible retarding efforts, whereby the machines may operate during subsequent parallel and series connection, in accordance with the curve sections FG and HI, down to the minimum available regenerative speed, whereafter the vehicle may be braked, in accordance with the lines IJ and JK, to a stand-still through the use of the customary mechanical braking systems, regenerative operation being discontinued at the relatively low speed somewhere near the point J.

Figure 3:
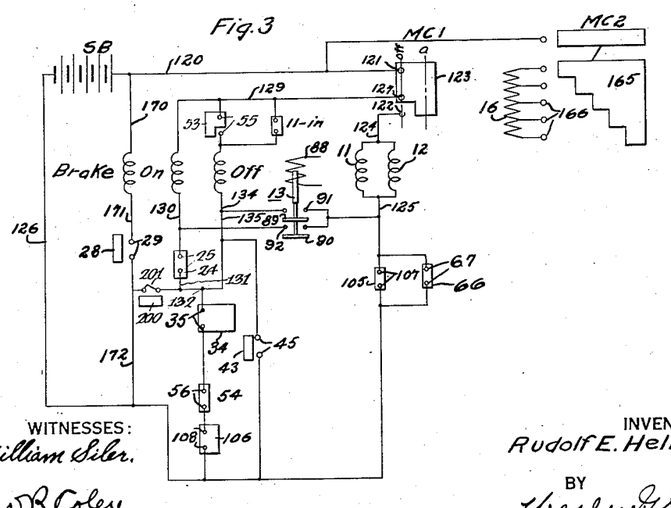
Fig. 3 is a diagrammatic view of an auxiliary control system for governing the main circuits that are shown in Fig. 1.

The auxiliary system shown in Fig. 3 comprises the actuating coils of the switches 11 and 12; the coils "On" and "Off" for the operating mechanism 8; and a coil marked "Brake", representing any desired form of mechanical brake; together with the various movable contact segments and coöperating stationary contact members of the relay devices 1 to 5, inclusive; the contact members of the over-voltage relay device 13; a battery SB or other suitable source of auxiliary energy for exciting the various actuating coils, in accordance with the operation of a master controller MC1; and a second master controller MC2 for varying the active circuit value of the resistor 16, which governs the excitation of the field winding 50 for the speed-relay device 4.

Assuming that the various relay devices and other control apparatus occupy the respective illustrated positions and that it is desired to effect acceleration of the main machines, the master controller MC1 may be actuated to its operative position $a$, whereby an auxiliary circuit is established from one terminal of the battery SB, through conductor 120, control fingers 121 and 122, which are bridged by contact segment 123 of the master controller MC1, conductor 124, parallel-related actuating coils of the switches 11 and 12, conductor 125, stationary and movable contact members 107 and 105 of the relay device 5, and conductor 126 to the opposite terminal of the battery.

A further circuit is established from the contact segment 123, in either position, through control finger 127, conductor 129, actuating coil "On", conductor 130, contact member 24 of the torque-limiting relay device 1, and conductor 131, to a junction-point 132, while another circuit is completed from the conductor 129 through interlock contact "11—in" of the switch 11, the actuating coil "Off", and conductors 134 and 135, to the junction-point 132, whence a common circuit is continued through contact members 34 and 35 of the accelerating-ampere-turn ratio-limiting relay device 2 in either of two positions thereof, contact members 54 and 56 of the speed-relay device 4 and contact members 106 and 108 of the preliminary-voltage-regulating device 5 to the negative battery conductor 126.

Referring temporarily to Fig. 1, the main circuits completed by the above-described manipulation of the master controller MC1 may be traced as follows: Assuming that the familiar initial exclusions of resistors from the main-machine circuits, and that series acceleration and series-parallel transition are omitted, for the sake of clearness and simplicity, the main circuit is established from the trolley through conductor 140, where the circuit divides, one branch including conductor 141, switch 11 in its closed position, conductors 142 and 143, main armature A1, conductor 144, resistor 14, conductors 145 and 146 and stabilizing resistor R1 to junction-point 147, and a second branch including conductor 148, switch 12 in its closed position, conductors 149 and 150, main armature A2, conductor 151, resistor 17, conductors 152 and 153 and the stabilizing resistor R2 to the junction-point 147, whence a common circuit is completed through conductors 154 and 155 to the negative supply-circuit conductor Ground.

The main field-winding-excitation circuit is established from the positive terminal of the exciting armature 61 of the motor-generator set 6, through conductor 154 to junction-point 147, where the circuit divides, one branch traversing stabilizing resistor R1, conductor 146, field winding F1 and conductors 156 and 157, to another junction-point 158, and the other branch including stabilizing resistor R2, conductor 153, main field winding F2 and conductors 159 and 160 to the junction-point 158, whence a common circuit is completed through conductor 161 to the negative terminal of the exciting armature 61.

An auxiliary circuit is established from the Trolley through conductors 140 and 162, the driving armature 60 of the motor-generator set 6, field winding 63 for the driving armature, conductor 163, field winding 64 for the exciting armature 61 and conductor 155 to Ground.

Under the above-described conditions of concurrent excitation of the actuating coils "On" and "Off," the control drum 7 will move forwardly to gradually include the resistors R1 and R2, thereby tending to weaken the main-field-winding excitation until certain of the relay devices act, as about to be set forth in detail, to interrupt the circuit of the off coil or of both coils to respectively arrest the forward movement of the controller or to cause a backward movement thereof, in accordance with the previously explained principles.

The adjustment of setting of the speed relay device 4 is effected by actuating the master controller MC2 to any desired position to effect engagement of a movable contact segment 165 with a set of stationary control fingers 166 that are connected to various intermediate points of the resistor 16, whereby a predetermined excitation of the relay-device field winding 50 (corresponding to the desired mean speed) for any given current traversing the main field winding F2 obtains and is differentially balanced against the excitation of the other field winding 49, which is energized in accordance with the main-machine voltage.

Whenever the excitations of the opposing field windings 49 and 50 substantially neutralize each other, during operating periods of the machines, the torque of the armature 48 is practically zero, and the relay device is held in the illustrated middle position by the springs 57 and 58. As the main machine increases in speed, upon striking a down grade for instance, the main-field-winding strength is thereby reduced to correspondingly decrease the excitation of the auxiliary field winding 50, whereby the opposing auxiliary field winding 49 predominates to induce a flux in the relay armature 48 that will rotatably move the armature in the direction indicated by the arrow and thus interrupt the connection between the stationary contact members 56 and the movable contact segment 54 of the relay device 4. In this way, the energizing circuits of the on coil and the off coil are deënergized (see Fig. 3) and the controller 7 is, consequently, moved backwardly to gradually exclude the resistors R1 and R2 from circuit and thus strengthen the excitation of the main field windings F1 and F2. Such movement of the controller 7 will continue until a balance again obtains between the excitation of the field windings 50 and 49 of the speed-relay device 4, whereupon the relay will move to its illustrated intermediate position, and forward movement of the controller 7 will be resumed unless certain of the other relay devices prevent such operation under undesirable or abnormal machine-circuit conditions, as about to be described.

To prevent the forward movement of the controller 7 from producing dangerously high accelerating currents, or excessive tractive efforts, by reason of the decrease of main-field-winding excitation, the torque-limiting relay device 1 will arrest the movement of the controller 7 whenever a predetermined maximum main-machine torque, as indicated by the accelerating current traversing the main-circuit resistor 14 and by the voltage of the main field winding F1, reaches a value sufficient to cause the armature 20 of the relay 1 to rotatably move in the direction indicated by the arrow and quickly interrupt the connection of the stationary contact members 25 with the movable contact member 24. In this way, the on actuating coil is deënergized (see Fig. 3) and the controller 7 is brought to a stand-still. Thus, at any time during the acceleration of the main machines, if the torque thereof attains a predetermined maximum desirable value, the relay device 1 operates to prevent further increase in torque.

Furthermore, when the machines are operating along the curve portion CD of Fig. 2, it is not only necessary to arrest the movement of the controller 7 when a predetermined maximum main-machine torque occurs, but it is also requisite to either arrest or reverse such movement whenever the ratio of main-field-winding ampere-turns to main-armature ampere-turns attains a certain value. Such a result is automatically accomplished during the accelerating period by the relay device 2. As indicated by the solid arrows representing main-armature or regenerated current and the dotted arrows representing exciting or main-field-winding current, each stabilizing resistor R1 and R2 carries the currents of the allied main armature and main field winding in the same direction. On the other hand, during acceleration, when the main-armature current is reversed, each resistor carries the difference of such currents. Consequently, whenever the main-field-winding current exceeds the main-armature current, the voltage drop across the corresponding stabilizing resistor R1 or R2 takes a certain direction which will cause the armature 30 of the relay device 2 to turn in the direction indicated by the corresponding arrow, which is the same direction as that produced by the action of the spring 36. Such action, however, by reason of the size of the contact member 34, does not interrupt connection with the stationary contact members 35, and the action of the controller 7 is not affected by such operation of the relay device 2. On the other hand, whenever the main-armature currents become larger than the main-field-winding currents, the above-mentioned voltage drop in the resistor R1, for example, reverses in direction and causes the armature 30 of the relay device 2 to operate in the opposite direction against the action of the spring 36 to interrupt the energizing circuits of both the "on" and the "off" actuating coils (see Fig. 3) to cause a backward movement and thus strengthen the main-field-winding excitation.

After the vehicle has reached the balancing or other desired speed, the master controller MC1 should be returned to its off position in order to allow the maximum amount of vehicle coasting. Such return movement of the master controller MC1 will cause the switches 11 and 12 to open, as well as any other circuit switches that may be governed by the master controller, while the controller 7 is held stationary or actuated in the one or the other direction, dependent upon the position of the voltage-regulating relay 5, which is adapted to balance main-armature voltage against supply-circuit voltage during the coasting period, as about to be described in detail.

However, if it is desired to change the speed of the vehicle for any reason, the master controller MC2 is actuated to a corresponding position to thus vary the setting of the speed relay 4, and the master controller MC1 should then be actuated to its operative position a. The voltage-regulating device 5 thereupon automatically actuates the controller 7 in the one or the other direction until the main-machine voltage is approximately equal to the supply-circuit voltage. Under such conditions, the relay device occupies its illustrated intermediate position to permit the completion of the energizing circuits for the switches 11 and 12, as hereinbefore described, whereupon the machines are connected to the supply circuit.

Such manipulation of the controller 7 by the relay device 5 occurs as follows: If the supply-circuit voltage exceeds the machine voltage (the switch 11 being open), the current traversing the armature 100 of the relay device, in conjunction with the uni-directional excitation of the field winding 102, turns the relay in the direction indicated by the arrow to open the energizing circuit, at contact members 106 and 108, of both the actuating coils for the operating mechanism 8, whereby the controller 7 is moved backwardly to strengthen the main field windings and raise the machine voltages. On the other hand, when the machine voltage is higher during the coasting period, current traverses the relay armature 100 in the reversed direction, and the resultant torque turns the relay in the opposite direction to close the circuit of both coils jointly at contact members 106 and 108, as well as that of the "off" coil individually at contact members 53 and 55, whereby forward movement of the controller 7 is effected, as previously described, to decrease the main-machine voltage.

When supply-circuit and machine-circuit voltage conditions are balanced in accordance with the design of the relay device 5, the centering springs 109 and 110 hold the drum 104 in its illustrated intermediate position, whereby the circuit of the "off" magnet is interrupted at contact members 53 and 55, leaving only the "on" magnet energized. This action holds the controller 7 in whatever position it happens to be. At the same time the energizing circuits of the actuating coils for the switches 11 and 12 are completed by the coöperating contact members 105 and 107 to close the switches, as hereinbefore set forth.

However, in case the main-machine voltage is not high enough to effect a return of the relay device 5 to its intermediate position, even when the controller 7 occupies its illustrated first or maximum-field-strength position, then the contact segment 67 bridges control fingers 66 in such first position of the controller, whereby the above-mentioned switch-energizing circuits are closed, as illustrated in Fig. 3, wherein the contact members 66 and 67 are connected in parallel relation to the contact members 105 and 107 of the relay device 5. After the switch 11 is in its closed position, the voltage across the relay armature 100 is of course zero and, therefore, relay 5 remains in its middle position. In order to permit the energization of the "off" magnet after switch 11 is closed, and although relay 5 is in its middle position, the "11—in" interlock contacts are connected in parallel to the relay contacts 55.

It will be understood that, if desired, the switches 11 and 12 may be initially closed, while corresponding switches in the main-field-winding circuits may be maintained open until a relay corresponding to the relay device 5 has adjusted the exciting-armature voltage to equal the desired main-field-winding voltage, whereupon the field-circuit switches may be closed.

If it is desired to decrease the vehicle speed under the above-described running conditions, the controller 7 must be prevented from excluding the stabilizing resistors R1 and R2 from circuit too rapidly, in order to prevent excessive tractive efforts and main-armature current, by reason of the increase of main-field-winding excitation, whenever the controller 7 is moved backwardly. This function is accomplished by the torque-limiting relay device 1, the present direction of rotation of the armature 20 being opposite to that previously described, by reason of the reversal of main-armature current. The torque of the auxiliary armature 20, to be effective, must be more strongly exerted than during the accelerating period, as indicated by the relative width of the contact segment 24 to the right of the stationary contact members 25, it being usually permissible to provide a relatively rapid rate of deceleration.

However, means should be provided for preventing the maximum desirable ratio of armature ampere-turns to field-winding ampere-turns from being exceeded during such deceleration, and the relay device 3 is adapted to perform this function. The field windings 38 and 39 of the relay device 3 are differentially energized, in accordance with main-armature current and main-field-winding voltage, respectively, whereby the relay device 3 occupies the illustrated position whenever a permissible ratio of armature ampere-turns to main-field-winding ampere-turns obtains during the regenerative period. It will be understood that the adjustment or setting of the relay device 3 corresponds to the particular machine design and that it is usually permissible to have larger armature currents than field-winding currents during regeneration. Whenever the maximum permissible ratio of ampere-turns obtains, the relay device armature 37 is actuated in the direction indicated by the arrow against the action of the spring 46 to energize the circuits of both actuating coils for the operating mechanism 8 through the agency of coöperating contact members 43 and 45 (see Fig. 3), and thus cause the controller 7 to move forwardly, whereby the main-field-winding excitation is weakened and the ratio in question is suitably diminished.

If desired, actuation of the relay device 1 in the direction of the arrow (corresponding to accelerating current) may be utilized to close the energizing circuit of the actuating coil marked "Brake" (Fig. 3) through conductor 170, contact members 28 and 29 and conductors 172 and 126, whereby the air-brakes or other mechanical braking systems may be brought into action at the end of the regenerative period, as will be understood without further description.

In addition to the above-mentioned torque relay devices, it is desirable to provide an over-voltage relay, such as 13, the actuating coil 88 of which is connected across the main armature A1. In case unduly high armature voltages exist, for any reason, the relay device 13 is actuated to its upper position, whereby movable disks 89 and 90 bridge pairs of stationary contact members 91 and 92, respectively, whereby the circuits of the "off" coil and the "on" coil are completed independently of the position of the various torque-relay devices, and the controller 7 is thus moved forwardly to weaken the main-field-winding excitation, until main-armature voltage conditions are again normal.

Instead of manually adjusting the master controller MC2, whereby the resistor 16 is varied to correspondingly alter the setting of the speed-relay device 4, suitable ramps, or other automatic operating devices may be located alongside the track to vary the vehicle speed, in accordance with grade and curve requirements, as will be understood.

In some cases, it may be desirable to provide means for inherently preventing any sudden increase of field-flux distortion, thus safely permitting operation of more slowly-acting devices, such as those hereinbefore described, to actually regulate the desired circuits. Such a combination may be readily produced by employing certain damper-winding connections in the polar faces of the main or the auxiliary machines, the preferable form of such damper windings being fully set forth and claimed in my co-pending application, Serial No. 178,951, filed July 6, 1917.

My invention thus provides means for manually setting and automatically maintaining a certain average speed, for instance, that represented by the dotted horizontal line D' E' of Fig. 2. The system thus is automatically operated from any point above or below the points D' and E' during the accelerating and regenerative period, respectively, down or up to such points, irrespective of track grades or curves. The speed relay 4 chiefly governs the operation, the control of which is temporarily assumed by some one of the various remaining relay devices when machine conditions change in such manner that some abnormal or undesirable operation, which the particular relay in question is designed to guard against, is approached.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a dynamo-electric machine, of means for regulating the machine speed while normal load conditions prevail, and other means for automatically controlling the load conditions of the machine to prevent abnormal electrical conditions in said machine while it remains connected for operation.

2. In a system of control, the combination with a dynamo-electric machine, of means for regulating the machine speed, means for adjusting the mean-speed value, and means for limiting the machine torque irrespective of such speed variations while maintaining operative circuit connections.

3. In a system of control, the combination with a dynamo-electric machine having an armature and a field winding, of means for regulating the machine speed in accordance with electrical machine conditions, means for adjusting the mean-speed value, and means for preventing a predetermined ratio of armature ampere-turns to field-winding ampere-turns from being exceeded irrespective of such speed variations.

4. In a system of control, the combination with a supply circuit and a dynamo-electric machine, of means for regulating the machine speed in accordance with electrical machine conditions, means for adjusting the mean-speed value, and means for automatically balancing the machine voltage against the supply-circuit voltage during coasting periods.

5. In a system of control, the combination with a dynamo-electric machine having an armature and a field winding, of means for varying the machine speed, means for adjusting the mean-speed value, and a torque-relay device having its component elements energized in accordance with certain armature and field-winding conditions for preventing predetermined abnormal electrical operation of said machine by reason of such speed variations.

6. In a system of control, the combination with a dynamo-electric machine having an armature and a field winding, of means for regulating the machine speed in accordance with electrical machine conditions, means for adjusting the mean-speed value, and a torque-relay device having its component elements energized in accordance with armature current and field-winding voltage for limiting the machine torque.

7. In a system of control, the combination with a dynamo-electric machine having an armature and a field winding, of means for varying the machine speed, means for adjusting the mean-speed value, and a torque-relay device having its component elements energized in accordance with certain armature and field-winding conditions for preventing a predetermined ratio of armature ampere-turns to field-winding ampere-turns from being exceeded.

8. In a system of control, the combination with a supply circuit and a dynamo-electric machine having an armature and a field winding, of means for varying the machine speed, means for adjusting the mean-speed value, and a torque-relay device having its component elements energized in accordance with certain machine and supply-circuit conditions for automatically balancing the machine voltage against the supply-circuit voltage during coasting periods.

9. In a system of control, the combination with a main dynamo-electric machine having an armature and a field winding, of means for varying the machine speed, means for adjusting the mean-speed value, and a torque-relay device having an armature winding and a plurality of differentially-related field windings energized in accordance with predetermined machine conditions.

10. In a system of control, the combination with a main dynamo-electric machine having an armature and a field winding, of means for regulating the machine speed in accordance with electrical machine conditions, means for adjusting the mean-speed value, and a torque-relay device having an armature winding energized in accordance with the main armature current and a plurality of differentially-related field windings respectively energized in accordance with main-armature current and main-field winding voltage.

11. In a system of control, the combination with a main dynamo-electric machine having an armature and a field winding, of a torque-relay device having its component elements energized in accordance with certain main-armature and main-field-winding conditions for varying the machine speed, means for manually adjusting the action of said relay device, and a torque-relay device having its component elements energized in accordance with certain main-armature and main-field-winding conditions for preventing abnormal electrical operation of said machine by reason of such speed variations.

12. In a system of control, the combination with a main dynamo-electric machine having an armature and a field winding, of a torque-relay device having its component elements energized in accordance with certain main-armature and main-field-winding conditions for varying the machine speed, means for manually adjusting the action of said relay device, and a torque-relay device having its component elements energized in accordance with main-armature current and main-field-winding voltage for limiting the machine torque.

13. In a system of control, the combination with a main dynamo-electric machine having an armature and a field winding, of a torque-relay device having its component elements energized in accordance with certain main-armature and main-field-winding conditions for varying the machine speed, means for manually adjusting the action of said relay device, and a torque-relay device having its component elements energized in accordance with certain main-armature and main-field-winding conditions for preventing a predetermined ratio of armature ampere-turns to field-winding ampere-turns from being exceeded.

14. In a system of control, the combination with a supply circuit and a dynamo-electric machine having an armature and a field winding, of a torque-relay device having its component elements energized in accordance with certain armature and field-winding conditions for varying the machine speed, means for manually adjusting the action of said relay device, and a torque-relay device having its component elements energized in accordance with certain machine and supply-circuit conditions for automatically balancing the machine voltage against the supply-circuit voltage during coasting periods.

15. In a system of control, the combination with a main dynamo-electric machine having an armature and a field winding, of a torque-relay device for varying the machine speed and having an armature winding energized in accordance with the main-armature current and a plurality of differentially related field windings respectively energized in accordance with main-armature current and main-field-winding voltage, and a torque-relay device having its component elements energized in accordance with certain main-armature and main-field-winding conditions for preventing abnormal electrical operation of said machine by reason of such speed variations.

16. In a system of control, the combination with a supply circuit and a dynamo-electric machine, of means for varying the machine speed, means for adjusting the mean-speed value, switching means for closing the machine circuit, and means for automatically balancing the machine voltage against the supply-circuit voltage during coasting periods and for actuating said switching means under predetermined conditions.

17. In a system of control, the combination with a dynamo-electric machine having an armature and an exciting field winding, of relay means for automatically preventing a relatively high ratio of armature ampere-turns to total field-winding ampere-turns from being exceeded while the machine remains operatively connected.

18. In a system of control, the combination with a dynamo-electric machine having an armature and a field winding, of a torque-relay device having its component elements energized in accordance with predetermined armature and field-winding electrical conditions for preventing a fixed ratio of armature ampere-turns to total field-winding ampere-turns from being exceeded.

19. In a system of control, the combination with a dynamo-electric machine, of means for varying the machine speed, means for determining at will the mean-speed value, and automatic means for concurrently limiting certain machine-circuit current conditions to predetermined values and ratios.

20. In a system of control, the combination with a dynamo-electric machine, of means for adjusting the machine speed while certain current conditions of the machine circuits remain within predetermined limitations, and other automatic means independent of speed for influencing the machine operation whenever said limitations are reached.

21. In a system of control, the combination with a dynamo-electric machine having an armature and a field winding, of means for adjusting the machine speed while certain current conditions of the machine circuits remain within predetermined limitations, and a plurality of relay means controlled by certain armature and field-winding conditions for influencing the machine operation whenever said limitations are reached.

22. In a system of control, the combination with a dynamo-electric machine having an armature and a field winding, of means for automatically preventing a relatively high ratio of armature ampere-turns to field-winding ampere-turns from being exceeded while permitting operation with any smaller ratio when the machine is operatively connected.

23. In a system of control, the combination with a dynamo-electric machine, of means for regulating the machine speed while predetermined current conditions thereof remain within fixed limitations, and automatic means independent of said speed for rendering the speed-regulating means temporarily inoperative whenever said limitations are reached and for influencing the machine operation in the one or the other direction to prevent the exceeding of said limitations.

24. In a system of control, the combination with a supply circuit and a dynamo-electric machine having an armature and a field winding, of means for varying the field excitation, means dependent upon machine voltage conditions for governing the first means during coasting operation, and means dependent upon machine current conditions for governing the first means during operation from said supply circuit.

In testimony whereof, I have hereunto subscribed my name this 18th day of May 1917.

RUDOLF E. HELLMUND.